United States Patent [19]
Leggate et al.

[11] Patent Number: 5,625,550
[45] Date of Patent: Apr. 29, 1997

[54] APPARATUS USED WITH AC MOTORS FOR COMPENSATING FOR TURN ON DELAY ERRORS

[75] Inventors: David Leggate, New Berlin; Russel J. Kerkman, Milwaukee, both of Wis.

[73] Assignee: Allen-Bradley Company, Inc., Milwaukee, Wis.

[21] Appl. No.: 313,633

[22] Filed: Sep. 27, 1994

[51] Int. Cl.⁶ .................................................. H02P 5/40
[52] U.S. Cl. ............................................. 363/132; 318/811
[58] Field of Search ............................... 363/41, 56, 43, 363/74, 78, 95, 131–132; 318/139, 811, 474, 490, 727, 732, 734, 810, 254, 439; 323/205, 207–210

[56] References Cited

U.S. PATENT DOCUMENTS

| | | | |
|---|---|---|---|
| 5,099,408 | 3/1992 | Chen et al. ............................. | 363/41 |
| 5,264,775 | 11/1993 | Namuduri et al. ..................... | 318/811 |
| 5,334,923 | 8/1994 | Lorentz et al. ......................... | 318/805 |
| 5,357,181 | 10/1994 | Mutoh et al. ........................... | 318/139 |
| 5,491,393 | 2/1996 | Uesugi .................................... | 318/439 |
| 5,532,570 | 7/1996 | Tajima .................................... | 318/809 |

Primary Examiner—Aditya Krishnan
Attorney, Agent, or Firm—Michael A. Jaskolski; John M. Miller; John J. Horn

[57] ABSTRACT

A method and apparatus for compensating for deviations in the alternating voltage produced by a PWM inverter. The necessary sequence in which inverter components must be triggered results in voltage error pulses that accumulate over time and result in deviations from ideal voltage at motor terminals. By allowing the error pulses to continue and adjusting the trigger times to compensate for the error pulses, the effect of the error pulses is negated and the voltage deviations are eliminated.

24 Claims, 9 Drawing Sheets

APPARATUS USED WITH AC MOTORS FOR COMPENSATING FOR TURN ON DELAY ERRORS

BACKGROUND

1. Field of the Invention

The present invention relates to variable frequency AC motors. More particularly, the present invention relates to a method and apparatus to compensate for voltage deviations at motor terminals due to switching time delays in pulse width modulated invertors.

2. Description of the Art

One type of commonly designed induction motor is a three phase motor having three Y-connected stator windings. In this type of motor, each stator winding is connected to an AC voltage source by a separate supply line, the source generating currents therein. Often, an adjustable speed drive (ASD) will be positioned between the voltage source and the motor to control motor speed.

Figure 2:
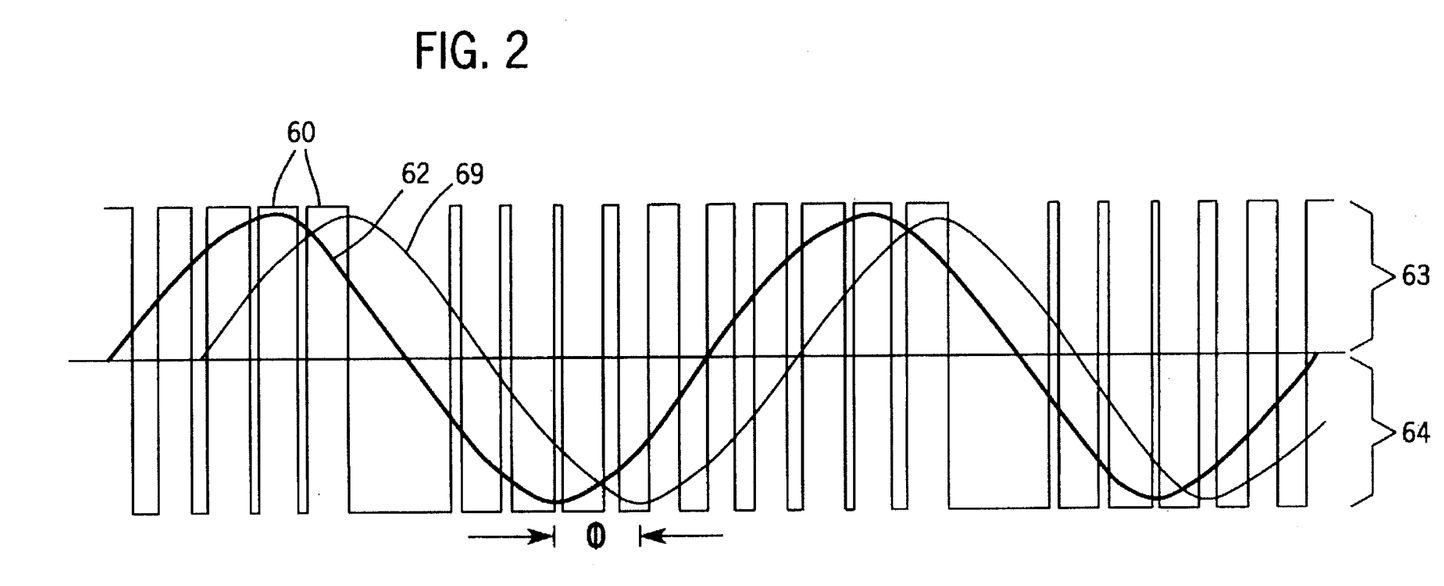
FIG. 2 is a graph illustrating the high frequency pulses and the resulting low frequency alternating voltage applied to a stator winding by a PWM inverter.

Many ASD configurations include a pulse width modulated (PWM) inverter consisting of a plurality of switching devices. By firing the switching devices in a regulated sequence the PWM inverter can be used to control both the amplitude and frequency of voltage that eventually reach the stator windings. Referring to FIG. 2, an exemplary sequence of high frequency terminal voltage pulses 60 that an inverter might provide to a motor terminal can be observed along with an exemplary low frequency alternating fundamental voltage 62 and related alternating current 69. By varying the widths of the positive portions 63 of each high frequency pulse relative to the widths of the negative portions 64 over a series of high frequency voltage pulses 60, a changing average voltage which alternates sinusoidally can be generated. The changing average voltage defines the low frequency alternating voltage 62 that drives the motor. The low frequency alternating voltage 62 in turn produces a low frequency alternating current 69 that lags the voltage by a phase angle $\phi$.

Many conventional motor applications require highly accurate alternating voltages over a wide speed range. Enhanced control of the alternating voltage can be achieved using a PWM inverter by increasing the frequency of the high frequency voltage pulses 60.

Figure 1:
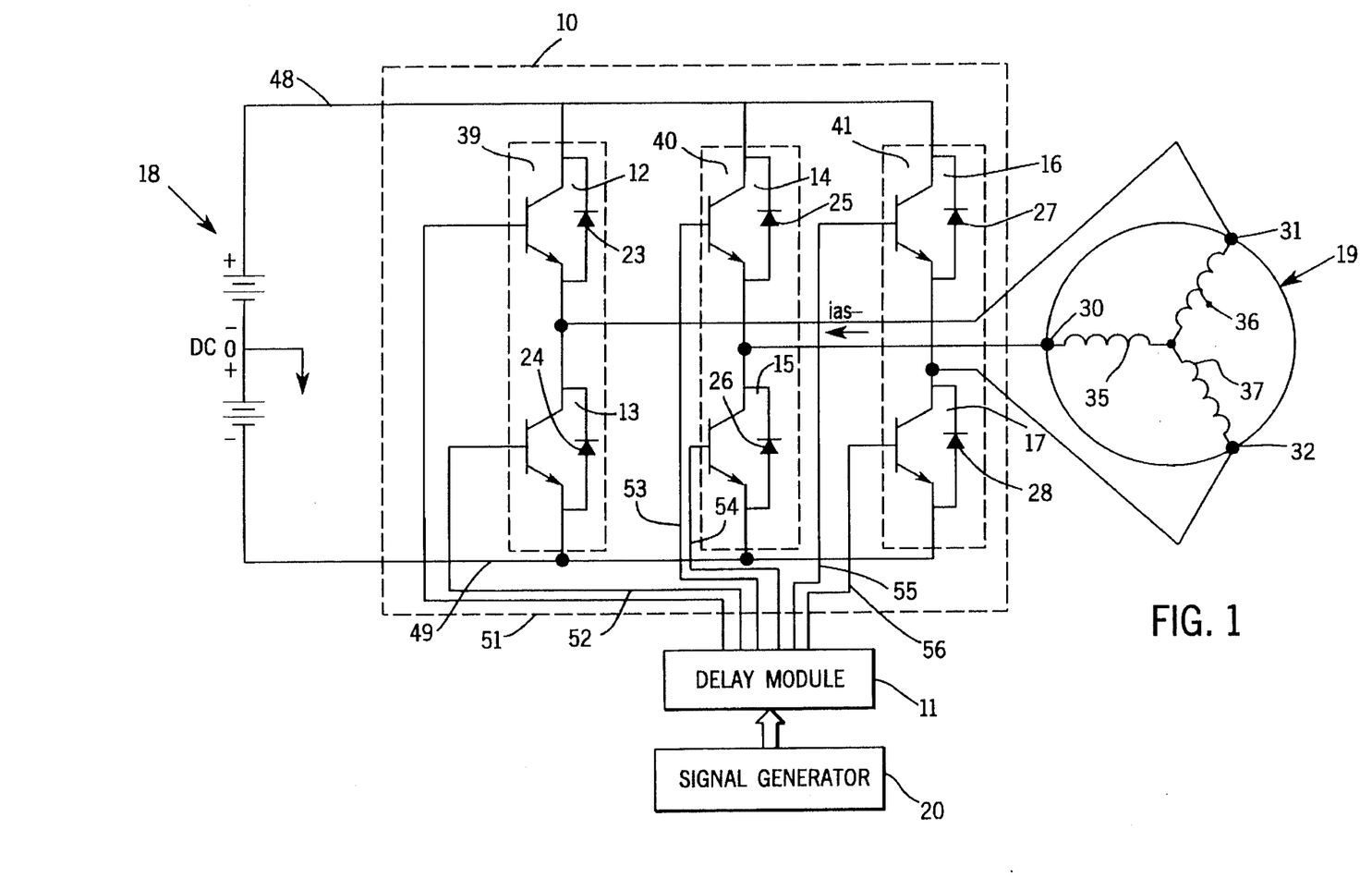
FIG. 1 is a schematic diagram of a motor controller and a signal generator which incorporates the present invention.

While advanced digital electronic signal generators can produce the desired high frequency signals to turn inverter components ON and OFF, the inverter components cannot turn ON and OFF instantaneously. Referring to FIG. 1, an exemplary inverter 10 has six switches 12–17. The switches 12–17 are arranged in series pairs, each pair forming one of three inverter legs 39, 40, and 41. Referring to leg 39, by turning the switches 12, 13 ON and OFF in a repetitive sequence, leg 39 receives DC voltage 18 and provides the high frequency pulses 60 of FIG. 2 to a motor terminal 31. Ideally, when one switch 12 turns on, the series switch 13 turns OFF, and visa versa.

In reality, however, each switch 12, 13 has turn-on and turn-off times that vary depending on the technology used for their construction. Thus, while signals to turn the upper switch 12 ON and the lower switch 13 OFF might be given at the same instant, the lower switch 13 may go ON faster than the upper switch 12 goes OFF thus providing an instantaneous DC short between a high DC rail 48 and a low DC rail 49. Such a DC short can cause irreparable damage to both the inverter and motor components.

To ensure that the series switches of an inverter are never simultaneously on, a delay module 11 is used to introduce a turn-on delay between the times when one switch turns off and the other switch turns on. Although these turn-on delays are very short, they tend to cause deviations from the precisely designed PWM signal. While each individual deviation does not appreciably affect the fundamental alternating voltage, accumulated deviations do distort the alternating voltage. This is particularly true in applications where the frequency of the high frequency pulses is increased because each additional pulse creates an additional deviation. Accumulated deviations produce torque pulsations, reduce fundamental output voltage, and distorted stator winding currents, all of which are undesirable.

To compensate for the deviations in PWM signals the industry has tried various methods of adding or subtracting correction waveforms to the PWM signals. While the proper phase for the correction waveform can be easily ascertained, it is difficult to determine the exact voltage gained or lost due to the deviations in the fundamental voltage. Thus, the amplitude of the correction waveform cannot be easily ascertained.

In order to find the proper amplitude for the correction waveform and a stable operating point, some sort of trial and error, or look-up table protocol, must be followed to determine the amount of gain or loss. In addition, once a controlled low frequency alternating fundamental voltage is achieved, if the motor load changes, the alternating fundamental voltage becomes uncontrolled and a new amount of gain or loss must be ascertained in order to regain control of the alternating fundamental voltage. These solutions are costly as they require dedicated hardware and computing time from a motor controller that could be used to monitor other motor parameters and operate other motor functions.

Thus, it would be advantageous to have a method and/or apparatus which could compensate for turn on delay in a PWM inverter that is not operating point specific or load dependent and that does not require a look-up table or trial and error protocol to determine how to alter PWM signals.

SUMMARY OF THE INVENTION

The present invention is a method for compensating for deviations in the alternating voltage produced by a PWM inverter. The necessary sequence in which inverter components must be triggered results in voltage error pulses that accumulate over time and result in deviations from ideal fundamental voltage at motor terminals. By allowing the error pulses to continue and adjusting the trigger times of inverter components to compensate for the error pulses, the present invention negates the effect of the error pulses and the voltage deviations are eliminated.

A PWM inverter consists primarily of four elements that correspond to each phase of the motor, two series connected transistors between a positive DC rail and a negative DC rail and two reverse recovery diodes, one diode in parallel with each transistor.

The method of the present invention provides an alternating current at a power lead between series connected transistors for driving an AC induction motor, the method comprises the steps of: switching the power lead at periodic switching times among the positive DC voltage rail, and a negative DC voltage rail to produce the alternating current wherein the power lead is in a transition state just prior to each switching time. The transition states occur when both transistors are non-conducting and one or the other diode is conducting. It is during these transition states or delay periods that errors occur in the fundamental voltage.

The method controls the switching times of the power lead so that: (i) if the alternating current is positive and the power lead is connected to the negative DC voltage, altering subsequent switching times including the next two switching times so that the power lead is connected to the positive DC voltage at an earlier point in time and the power lead is disconnected from the negative DC voltage at an earlier point in time; and (ii) if the alternating current is negative and the power lead is connected to the negative DC voltage, changing the subsequent switching times, including the following two switching times, wherein the following switching times are the switching times after the next two switching times, so that the power lead is connected to the negative DC voltage at a earlier point in time and the power lead is disconnected from the positive DC voltage at an earlier point in time.

In a preferred method wherein the power lead remains in the transition state for a delay period, the step of altering subsequent switching times includes the step of subtracting the delay period from each of the next two switching times and the step of changing the next switching times includes the step of subtracting the delay period from each of the following two switching times.

Thus, one object of the present invention is to compensate for the deviations in the alternating fundamental voltage due to the delay periods prior to the deviations occurring. The delay period is always constant and is known. The effect of the delay periods is also known. By adjusting the switching times of the positive and negative DC connections, the delay periods can be adjusted and the resulting deviations can be used to produce desired terminal fundamental voltage rather than erroneous fundamental voltage.

Other objects of the invention are to compensate for turn-on delay deviations in a manner which is not load dependent and to eliminate the need for a trial and error protocol to find a stable operating point. Because the delay period is constant, the method of the present invention is not load dependent. For the same reason, the present invention eliminates the need for a guessing game to determine a stable operating point.

In yet another preferred method, the step of altering subsequent switching times includes the step of delaying the following two switching times so that the following switching times occur at a later point in time and wherein the step of changing subsequent switching times includes the step of delaying the next two switching times so that the next two switching times occur at a later point in time.

Where power lead remains in the transition state for a delay period, the step of altering the subsequent switching times may include the steps of subtracting the delay period from the next two switching times and adding the delay period to the two following switching times and the step of changing subsequent switching times may include the steps of adding the delay period to the next two switching times and subtracting the delay period from the following two switching times.

Thus, another object of the present invention is to allow compensation for delay period deviations to be calculated with a minimal number of calculations. Instead of doing the calculations to alter the switching times each time the power lead changes connection, this method provides a simple way to correct for the delay period deviations by calculating every other time the power lead changes connection. While ½ the pulse width of the time delay is subtracted or added to each end of a pulse, after the delay error takes place, the period of the alternating fundamental voltage is accurate.

In addition, this method is particularly useful with processors that have computational constraints. For example, when the 80C 196MC microelectronic processor as supplied by Intel Corporation of Santa Clara, Calif., is operating in certain modes (mode 0), it must alter next and following switching times together (i.e. when the next switching time is delayed, the following switching time must be expedited and when the next switching time is expedited, the following switching time must be delayed.

Another method of the present invention is used with a variable frequency motor controller including an inverter, a delay module, and a signal generator. The inverter receives DC voltage from a DC voltage supply and produces an alternating voltage and related alternating current. The signal generator provides related upper and lower signals for controlling the inverter, each of the upper and lower signals being either in an ON state or an OFF state, the signal states being altered in a repetitive sequence such that when one signal is ON, the other is OFF, a turn-on time for each signal is defined each time said signal goes from the OFF to the ON state and a switching instance is defined each time the state of the upper signal changes.

The signal generator provides the upper and lower signals to the delay module. The delay module delays the turn-on time of each signal by a delay period.

The method comprises the steps of: receiving the upper signal; determining the state of the upper signal; determining a next switching instance and a following switching instance, wherein the following switching instance is the switching instance after the next switching instance; determining the phase of the alternating current; if the phase of the alternating current is positive and the upper signal is OFF, altering subsequent switching instances including the next switching instance so that the next switching instance occurs earlier in time, thus producing a new switching instance; if the phase of the alternating current is negative and the upper signal is OFF, changing subsequent switching instances including the following switching instance so that the following switching instance occurs at an earlier point in time, thus producing a new switching instance; and providing the new switching instance to the delay module.

A preferred method includes the step of receiving the delay period and altering the next switching instance by subtracting the delay period from the next switching instance and changing the next switching instance by subtracting the delay period from the following switching instance to produce altered upper and lower signals.

Thus, in keeping with the object of limiting the calculations necessary to compensate for the delay period deviations, by altering the switching instances prior to the addition of the delay periods, the number of signal alterations is limited.

The present invention also includes an apparatus to be used with the method described above. The apparatus includes a switch to alternately connect the power lead at periodic switching times among a positive DC voltage and a negative DC voltage to produce the alternating current, wherein the power lead is in a transition state just prior to each switching time; a controller that controls the switching times so that: (i) if the alternating current is positive and the power lead is connected to the negative DC voltage, the subsequent switching times, including the next two switching times, are altered so that the power lead is connected to the positive DC voltage at an earlier point in time and the power lead is disconnected from the negative DC voltage at an earlier point in time; and (ii) if the alternating current is negative and the power lead is connected to the negative DC voltage, the subsequent switching times, including the following two switching times, are changed so that the power lead is connected to the negative DC voltage at an earlier point in time and the power lead is disconnected from the positive DC voltage at an earlier point in time, wherein the following two switching times are the two switching times after the next two switching times.

In a preferred apparatus, the controller controls the switching times so that the power lead remains in the transition state for a delay period and the controller includes a subtractor that alters the next two switching times by subtracting the delay period from the next two switching times and that changes the next two switching times by subtracting the delay period from the following two switching times.

In another preferred apparatus, the controller includes a compensator module that: if the alternating current is positive and the power lead is connected to the negative DC voltage, alters the two following switching times so that the following switching times occur at a later point in time; and if the alternating current is negative and the power lead is connected to the negative DC voltage, changes the next two switching times so that the next two switching times occur at a later point in time.

In this preferred apparatus, the controller may control the switching times so that the power lead remains in the transition state for a delay period and the controller includes a subtractor that alters the next two switching times by subtracting the delay period from each of the next two switching times and that changes the following two switching times by subtracting the delay period from each of the following two switching times, and wherein the compensator module includes an adder that alters the two following switching times by adding the delay period to each of the two following switching times and changes the next two switching times by adding the delay period to each of the two next switching times.

Other and further aspects of the present invention become apparent during the course of the following description and by reference to the accompanying drawings.

BRIEF DESCRIPTION OF THE DRAWINGS

FIGS. 3(d) and 3(g) are graphs illustrating high frequency pulses delivered to a motor terminal;

DETAILED DESCRIPTION OF THE PREFERRED EMBODIMENT

The present invention will be described in the context of the exemplary PWM inverter 10 shown in FIG. 1. The inverter 10 is shown connected to a delay module 11, a DC voltage source 18, and a motor 19. The inverter consists of six solid state switching devices 12–17 (BJT, GTO, IGBT or other transistor technology devices may be used) arranged in series pairs, each switching device 12–17 being coupled with an inverse parallel connected diode 23–29.

Each series arranged pair of switching devices 12 and 13, 14 and 15, and 16 and 17, make up a separate leg 39, 40 or 41 of the inverter 10 and have a common node which is electrically connected to a unique motor terminal 30, 31, or 32 (and thus to a unique stator winding 35, 36, or 37). Each switching device 12–17 is also electrically connected by a firing line 51–56 to the delay module 11 and indirectly through the delay module to a signal generator 20. A split DC voltage source 18 creates a high voltage rail 48 and a low voltage rail 49 and each leg 39, 40, 41 connects the high voltage rail 48 to the low voltage rail 49.

To avoid repetitive disclosure, the PWM inverter 10 will be explained by referring only to leg 39 as all three legs 39, 40, and 41 of the inverter operate in the same manner.

The signal generator 20 and delay module 11 operate together to turn the switching devices 12, 13 of leg 39 ON and OFF in a repetitive sequence that alternately connects the high and low voltage rails 48, 49 to, and produces a series of high frequency voltage pulses at, terminal 31. The high frequency voltage pulses average over a given period to produce a low frequency alternating voltage at terminal 31.

Referring to FIG. 2, an exemplary sequence of high frequency pulses 60 that an inverter 10 might provide to motor terminal 31 can be observed along with an exemplary low frequency alternating voltage 62. By varying the widths of the positive portions 63 of each high frequency pulse relative to the widths of the negative portions 64 over a series of pulses 60, a changing average voltage value which alternates sinusoidally can be generated. The changing average value defines the low frequency alternating voltage 62 that drives the motor 19. As well known in the art, the low frequency alternating voltage 62 produces a terminal current 69 that lags the low frequency alternating voltage 62 by a phase angle $\phi$.

Figure 3A:
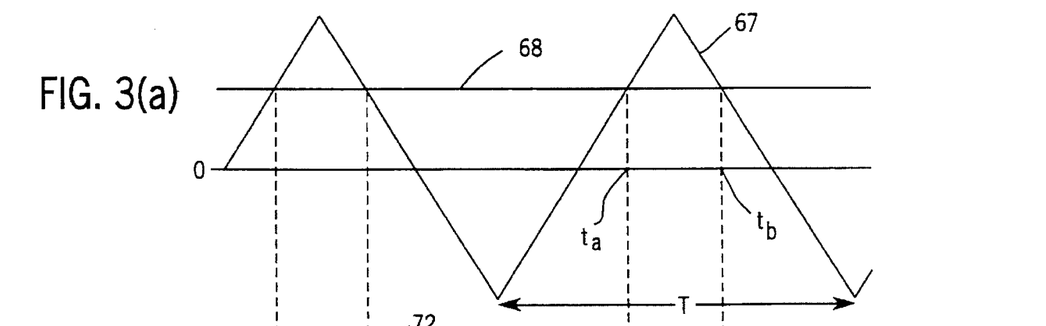
FIG. 3(a) is a graph illustrating the waveforms used by a PWM inverter to produce the high frequency pulses shown in FIG. 2, FIGS. 3(b), 3(c), 3(e), and 3(f) are graphs illustrating PWM firing pulses.

Referring to FIG. 3(a), the waveforms used by the signal generator 20 to generate the firing pulses for leg 39 may be observed. As well known in the art, the carrier waveform 67 is perfectly periodic and operates at what is known as the carrier frequency. The command voltage waveform 68 is sinusoidal, having a much greater period than the carrier voltage waveform 67.

Figures 3B, 3C:
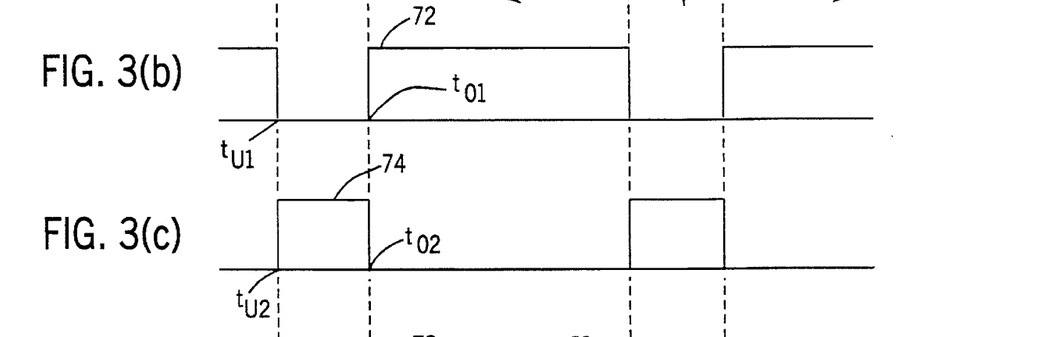

Referring also to FIGS. 3(b) and 3(c), an upper signal 72 and a lower signal 74 that control the upper and lower switches 12, 13 respectively can be observed. The turn-on $t_{u1}$, $t_{u2}$ and turn-off $t_{o1}$, $t_{o2}$ times of the upper and lower signals 72, 74 come from the intersections of the command waveform 68 and the carrier waveform 67.

When the command voltage waveform 68 intersects the carrier waveform 67 while the carrier waveform has a positive slope, the upper signal 72 goes OFF and lower signal 74 goes ON. On the other hand, when the command waveform 68 intersects the carrier waveform 67 while the carrier waveform has a negative slope, the upper signal 72 goes ON and the lower signal 74 goes OFF. Thus, by comparing the carrier waveform 67 to the command waveform 68, the state of the upper and lower signals 72, 74 can be determined. The upper and lower signals 72, 74 are provided to the delay module 11.

Figures 3D, 3E:
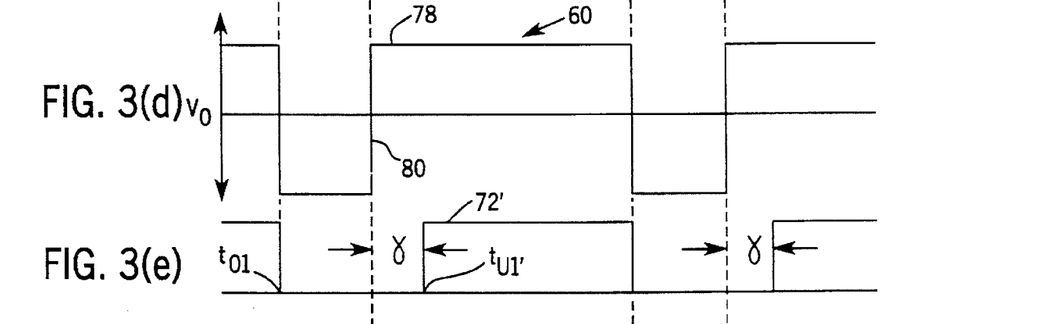

Referring also to FIGS. 1 and 3(d), an ideal high frequency voltage pulse 60 resulting from the upper and lower signals 72, 74 in FIGS. 3(b) and 3(c) that might be provided at terminal 31 can be observed. When the upper signal 72 is ON and the lower signal 74 is OFF, switching device 12 allows current to flow from the high voltage rail 48 to motor terminal 31 thus producing the positive phase 78 of pulse 60 at motor terminal 31. Ideally, when the upper signal 72 goes OFF and the lower signal 74 goes ON, switching device 12 immediately turns OFF and switching device 13 immediately turns ON connecting motor terminal 31 and the low voltage rail 49 producing the negative phase 80 of pulse 60 at motor terminal 31. Thus, the ideal high frequency voltage pulse 60 is positive when the upper signal 72 is ON and is negative when the lower signal 74 is ON.

Figures 3F, 3G:
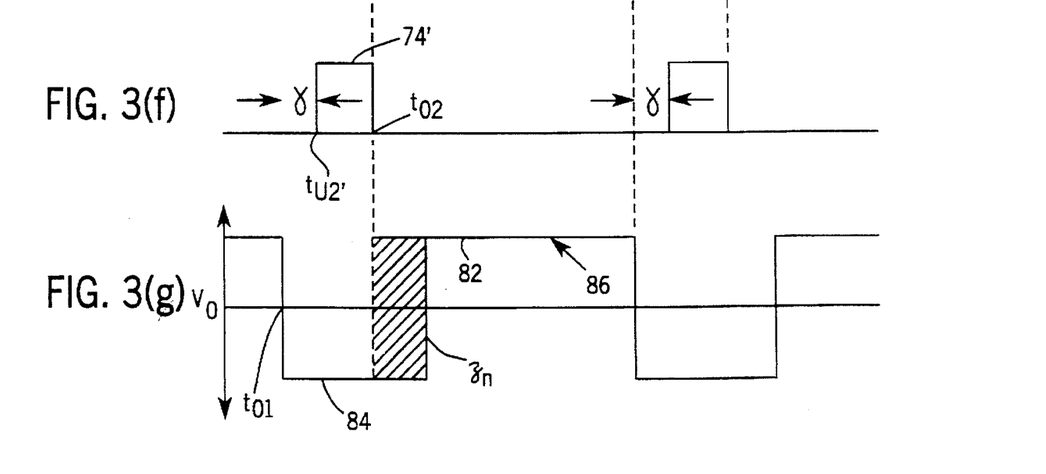

In reality, however, because switches 12 and 13 cannot instantly turn ON and OFF, to avoid a D.C. shortage between rails 48 and 49 due to series switches that are simultaneously on, the delay module 11 modifies the upper and lower signals 72, 74 by adding a turn-on delay period γ prior to the turn-on times $t_{u1}$, $t_{u2}$ of each of the upper and lower signals 72, 74. Referring to FIGS. 3(e) and 3(f), the delay periods γ produce delayed and shortened upper and lower signals 72' and 74' having delayed turn-on times $t_{u1'}$, $t_{u2'}$.

Referring to FIG. 3(g), while the delay periods γ protect the motor and inverter components, they produce voltage deviations $\zeta_n$ at the motor terminal 31 that produce distorted positive and negative phases 82, 84 and a distorted high frequency voltage pulse 86. These deviations $\zeta_n$ can best be understood by referring to FIGS. 1, 2, and 3(e)–3(g).

Referring to FIGS. 1, 2 and 3(e)–3(g), while the terminal current 69 at motor terminal 31 might be positive, the high frequency voltage pulses 60 will be oscillating from positive to negative phase as the delayed upper and lower signals 72', 74' turn the switches 12, 13 ON and OFF. Thus, while the terminal current 69 is positive, two signal states may occur. First, the upper signal 72 may be OFF while the lower signal 74 is ON and second the upper signal 72 may be ON while the lower signal 74 is OFF. Likewise, when the current 69 is negative, the same two signal states may exist.

When the terminal current is positive, and switch 12 is ON while switch 13 is OFF, the high voltage rail 48 is connected to motor terminal 31. Diode 24 blocks the flow of current to the low voltage rail 49. When the upper switch 12 turns OFF at $t_{o1}$, both series switches 12, 13 remain OFF during the delay period γ. As well known in the art, motors have internal inductance. Because of motor inductance, the terminal current 69 caused by the low frequency alternating voltage 62 cannot change directions immediately to become negative each time the high frequency voltage pulse 60 changes from the positive 63 to the negative 64 phase. The current remains positive and diode 24 immediately begins to conduct at $t_{o1}$ connecting the low voltage rail 49 to motor terminal 31 as desired. Hence, the terminal voltage goes negative at the desired time $t_{o1}$ even though the turn-on time $t_{u2}$ of the delayed lower signal 74' does not occur until after the delay period γ.

On the other hand, when switch 12 is initially OFF and switch 13 is ON and the terminal current 69 is positive, the low voltage rail 49 is connected through switch 13 to motor terminal 31 as desired and the resulting terminal voltage pulse 86 is in the negative phase 84 at terminal 31. When switching device 13 turns OFF at $t_{o2}$, as the positive terminal current 69 cannot immediately reverse itself, diode 24 conducts and low voltage rail 49 is again connected to motor terminal 31 for the duration of delay period γ. Thus, during the delay period γ, instead of having positive phase voltage at terminal 31 as desired, the negative phase 84 of the resulting terminal voltage pulse is extended at terminal 31 until the turn-on time $t_{u1}$ of the delayed upper signal 72'.

Comparing FIGS. 3(d) and 3(g), the resulting terminal voltage pulses 86 have wider negative phases 84 and narrower positive phases 82 than the ideal voltage pulses 60. A voltage deviation $\zeta_n$ occurs each time the lower switch 13 is turned OFF and the terminal current 69 is positive. The cumulative effect of these voltage deviations $\zeta_n$ cause torque irregularities and distort the low frequency alternating fundamental voltage 62 and current 69 of FIG. 2.

Figures 4A, 4B, 4C:
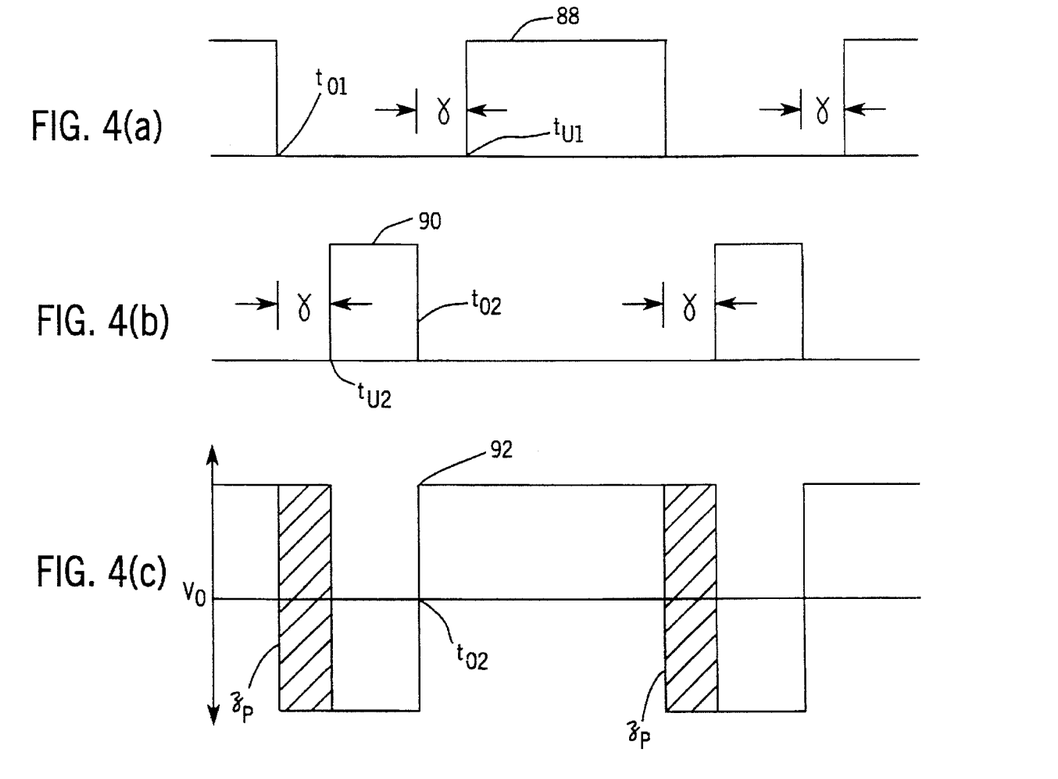
FIGS. 4(a) and 4(b) are graphs illustrating PWM firing pulses and FIG. 4(c) is a graph illustrating high frequency pulses.

A similar type of error is produced when the terminal current 69 is negative and the upper switch 12 turns from ON to OFF. Referring to FIGS. 4(a)–4(c), delayed upper and lower signals 88, 90 and a resulting terminal voltage pulse sequence 92 having errors $\zeta_p$ can be compared.

Referring also to FIGS. 1 and 2, when the terminal current 69 is negative and the delayed lower signal 90 turns OFF at $t_{o2}$ turning switch 13 OFF, diode 23 immediately connects high voltage rail 48 to terminal 31. While both switches 12, 13 are off, the inverter is in a transition state. Thus, at turn-off time $t_{o2}$, resultant terminal voltage pulse 92 turns positive as desired. No error results during this switching sequence.

However, when the terminal current 69 is negative and the delayed upper signal 88 turns OFF at $t_{o1}$, turning switch 12 OFF, as both switches 12 and 13 are OFF and the terminal current 69 cannot reverse immediately to become positive, diode 23 conducts and which connects high voltage rail 48 to terminal 31. Thus, during γ, instead of connecting to the low voltage rail 49 and going negative as desired, the motor terminal 31 remains connected to the positive rail 48 and the resultant terminal voltage pulse 92 remains positive causing error p to result.

Referring to FIGS. 2, 3(g), and 4(c), during both negative and positive phases of the terminal current 69, the delay periods produce voltage distorting errors $\zeta_n$ and $\zeta_p$. To correct for these errors, the present invention adjusts the turn-on and turn-off times of the switches, allowing the distorting errors $\zeta_n$, $\zeta_p$ to occur, but compensating for them prior to their occurrence. The present invention contemplates two preferred methods (and apparatuses) that are based on the same principles to compensate for the distorting errors $\zeta_n$ and $\zeta_p$. The first method is known as the unsymmetrical pulse method and the second method is known as the symmetrical pulse method.

UNSYMMETRICAL PULSE METHOD

Referring to FIGS. 2, 3(f) and 3(g), when the terminal current 69 is positive, an error $\zeta_n$ take place each time the delayed lower signal 74' turns OFF at $t_{o2}$. Similarly, referring to FIGS. 2, 4(a) and 4(c), when the terminal current 69 is negative, an error $\zeta_p$ takes place each time the delayed upper signal 88 turns OFF at $t_{o1}$. The errors $\zeta_n$ and $\zeta_p$ always have the same amplitude (that of the DC voltage source) and duration γ. Thus, by adjusting the turn-off $t_{o1}$, $t_{o2}$ and turn-on times $t_{u1}$, $t_{u2}$ of the delayed upper and lower signals to account for the errors $\zeta_n$, $\zeta_p$, the errors can be eliminated.

Figure 5A:
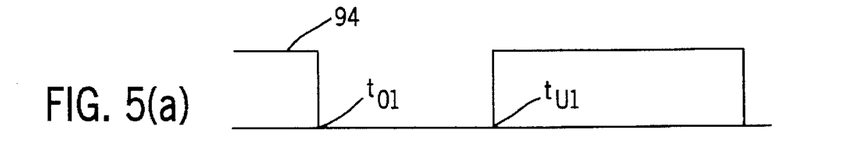
FIGS. 5(a)–5(f) are graphs illustrating PWM firing pulses and FIGS. 5(g) and 5(h) are graphs illustrating high frequency pulses.
Figure 5B:
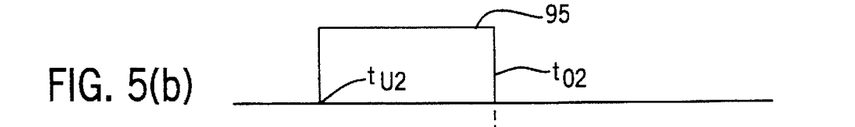
Figure 5C:
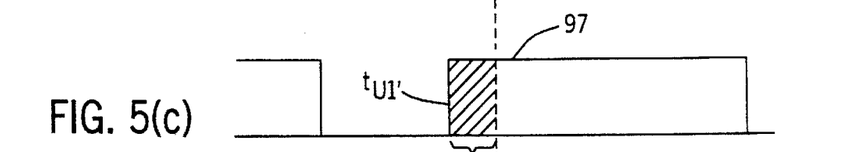
Figure 5D:
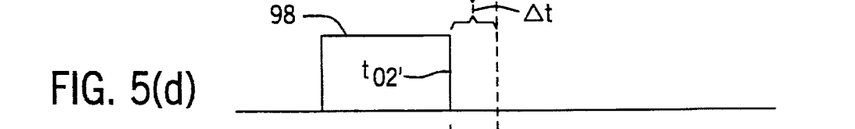

Referring to FIGS. 5(a) and 5(b), ideal upper and lower signals 94, 95 can be observed having turn-on $t_{u1}$, $t_{u2}$ times and turn-off $t_{o1}$, $t_{o2}$ times respectively γ. Referring also to FIG. 5(h), given the ideal upper and lower signals 94, 95, the ideal high frequency pulse sequence 105 results. Referring to FIGS. 2, 5(c), and 5(d), when the terminal current 69 is positive, the present invention adjusts the turn-on time $t_{u1}$ for the upper switch 12 and the turn-off time $t_{o2}$ for the lower switch 13 by Δt, where Δt is equal to the delay period γ. The new turn-on and turn-off times produce altered upper and lower signals 97, 98.

Figure 5E:
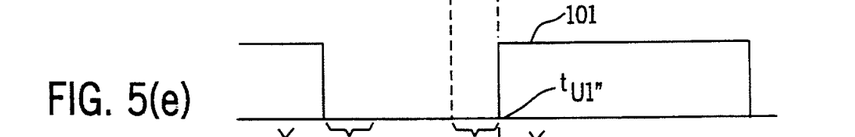
Figure 5F:
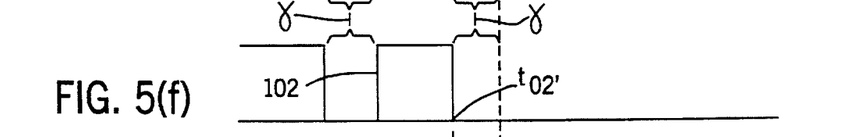

Referring now to FIGS. 5(e) and 5(f), in order to protect the motor and inverter components, the delay periods ζ is added to the altered upper and lower signals 97, 98 producing delayed upper and lower signals 101, 102. Note that delayed upper signal 101 has a turn-on time $t_{u1''}$ which is identical to the turn-on time $t_{u1}$ of the ideal upper signal 94 (see FIG. 5(a)). When delayed lower signal 102 turns OFF at $t_{o2''}$, switch 13 turns OFF, both switches 12, 13 remain OFF during γ, diode 24 conducts and connects low voltage rail 49 to terminal 31, the error $ζ_n$ results, and the error $ζ_n$ extends the duration of the negative phase 103 of the resultant terminal voltage waveform 104.

Figure 5G:
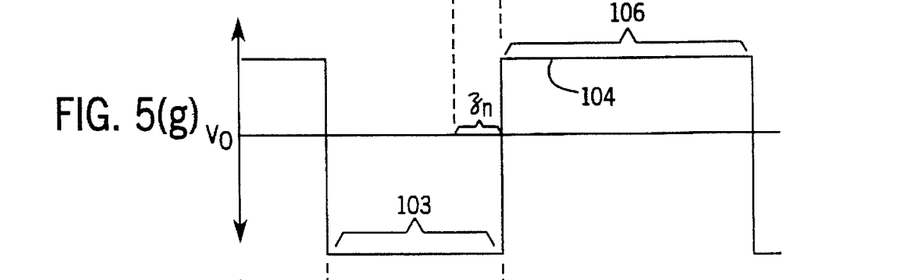
Figure 5H:
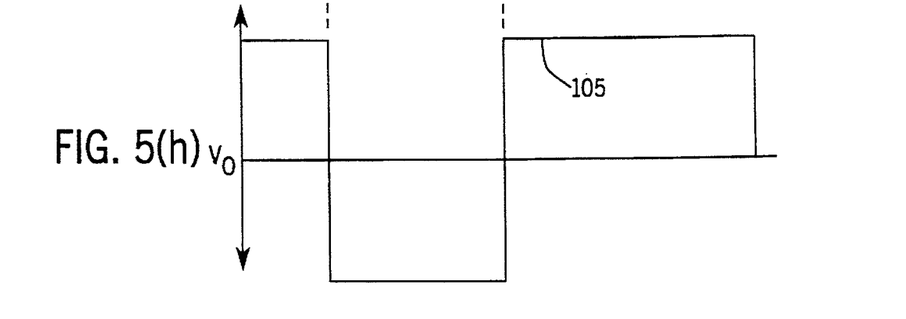

Referring now to FIGS. 5(g) and 5(h), the resulting waveform 104 is identical to the ideal waveform 105. Thus, although the error $ζ_n$ still occurs, by adjusting the turn-on and turn-off times of the upper and lower signals 94, 95 prior to the execution of adding the delay periods γ, the errors $ζ_n$ can be used to form necessary parts of the resultant waveform 104.

Figure 6A:
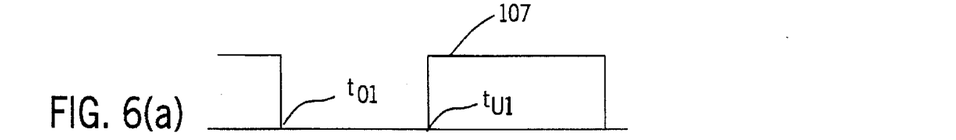
FIGS. 6(a), 6(b), 6(d)–6(g) are graphs illustrating PWM firing pulses
Figure 6B:
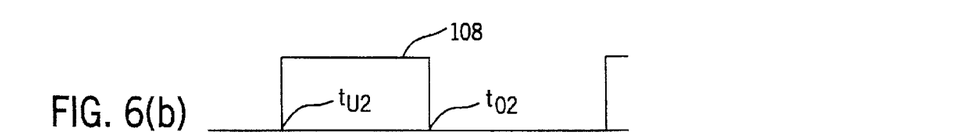
Figure 6C:
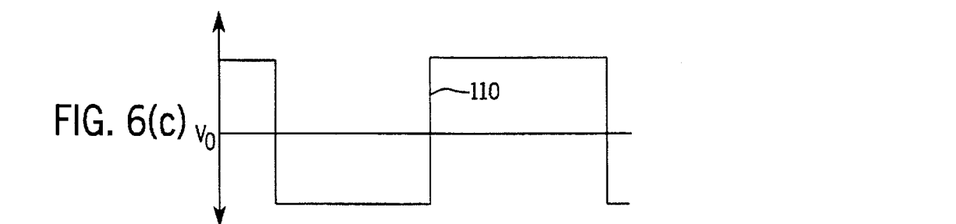
FIGS. 6(c) and 6(h) are graphs illustrating high frequency pulses.
Figure 6D:
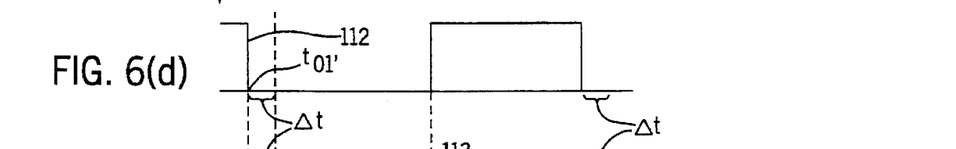
Figure 6E:
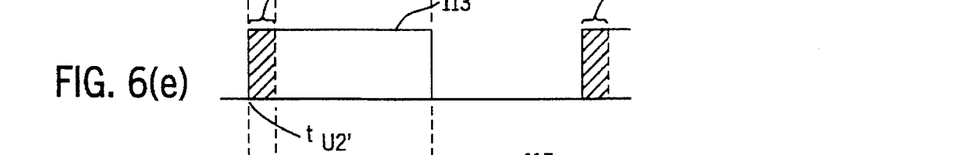

In a similar fashion, the errors $ζ_p$ in FIG. 4(c) can be compensated by adjusting the turn-on $t_{u1}$, $t_{u2}$ times and turn-off $t_{o1}$, $t_{o2}$ times of the upper and lower signals. In FIGS. 6(a)–6(c), ideal upper and lower signals 107, 108 produce an ideal terminal voltage sequence 110. Referring to FIGS. 2, 6(d) and 6(e), terminal current 69 is negative, using the unsymmetrical method the turn-off time $t_{o1}$ of the upper signal and the turn-on time $t_{u2}$ of the lower signal are delayed by Δt, where Δt is equal to the delay period γ, so that an altered upper signal 112 turns OFF at an earlier time $t_{o1'}$ and adjusted lower signal 113 turns ON at an earlier time $t_{u2'}$.

Figure 6F:
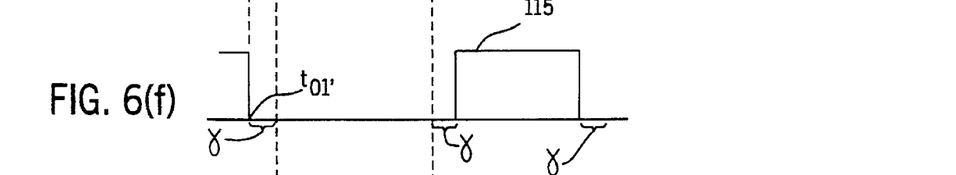
Figure 6G:
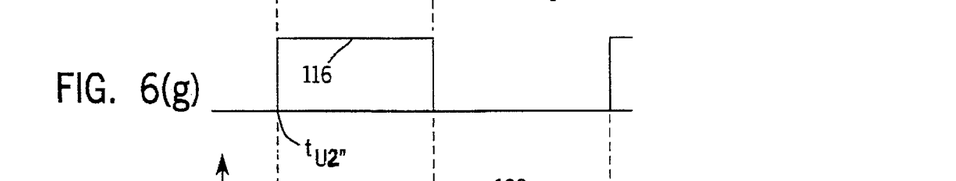
Figure 6H:
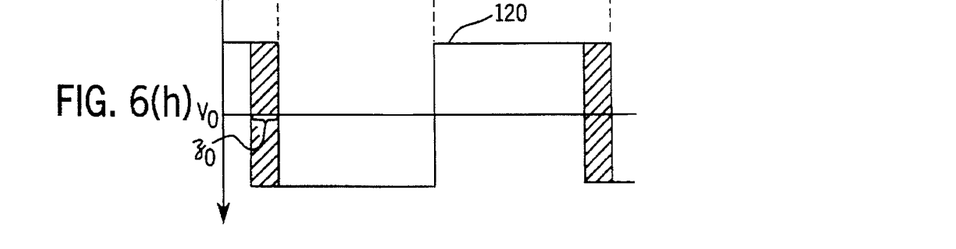

Referring to FIGS. 6(f) and 6(g), a delay period γ is then added to the altered upper and lower signals 112, 113 producing delayed upper and lower signals 115, 116 wherein the delayed lower signal 116 has a delayed turn-on time $t_{u2''}$ that is coincident with the turn-on time $t_{u2}$ of the ideal lower signal 108 (see FIG. 6(b)). When the delayed upper signal 115 goes OFF at $t_{o1''}$, switch 12 goes OFF, the terminal current 69 remains in the negative phase and diode 23 conducts, the high voltage rail 48 remains electrically connected to terminal 31, and the voltage at terminal 31 remains positive during γ. When the lower signal 116 goes ON at $t_{u2''}$, diode 23 turns OFF, and terminal 31 is connected to the low voltage rail 49 as desired. Thus, the error $ζ_p$ still occurs but is accounted for and the resultant waveform 120 shown in FIG. 6(h) is identical to the ideal waveform 110 shown in FIG. 6(c).

It should be understood that the unsymmetrical pulse method described above could easily be implemented in software run by a signal generator or other processing unit. Nevertheless, the present invention also contemplates a signal generator implemented in hardware to be used with the unsymmetrical pulse method described above.

Figure 9:
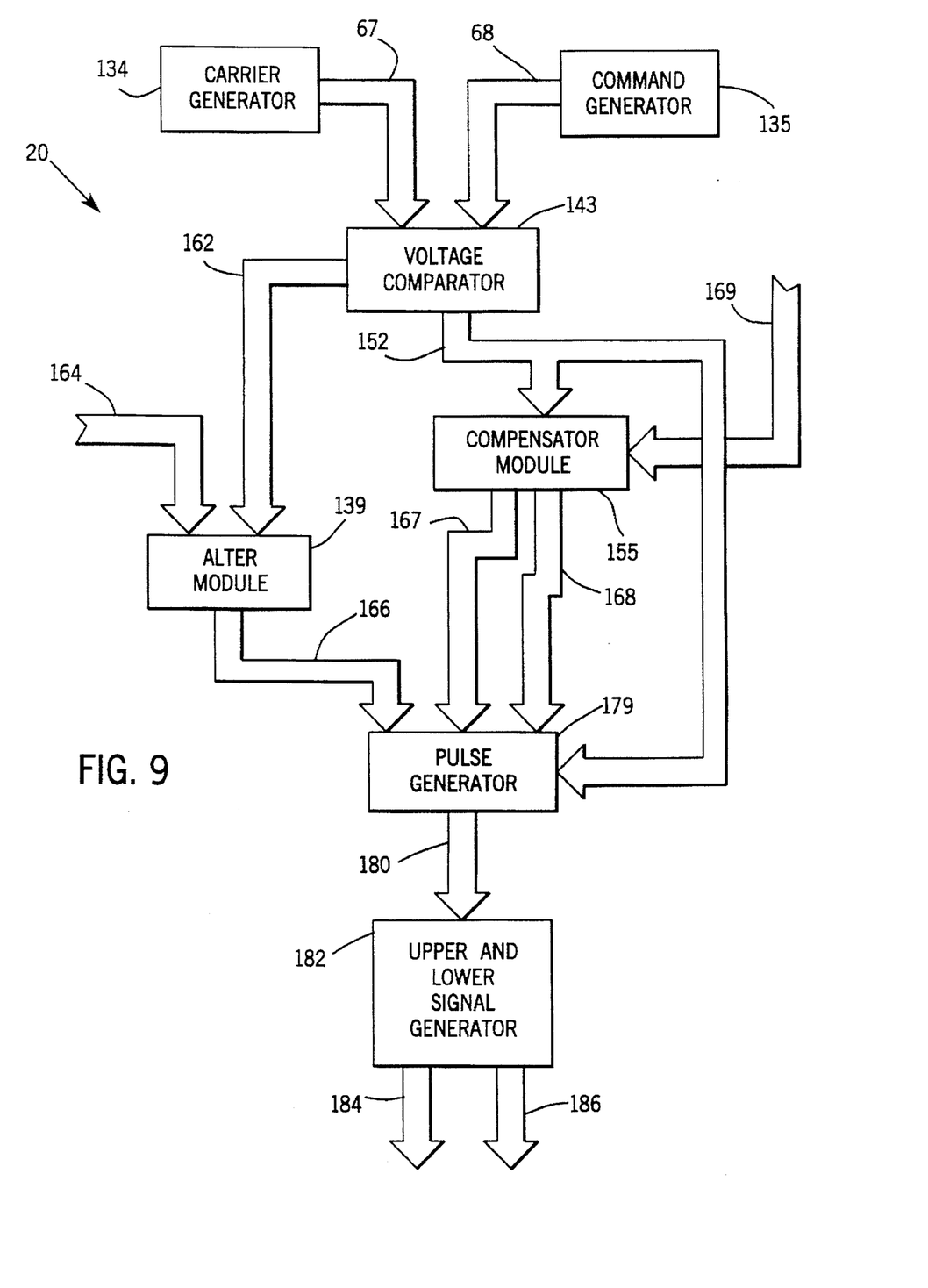
FIG. 9 is a block diagram of the signal generator used in the present invention.

Referring to FIGS. 1 and 9, the signal generator 20 of the present invention includes a plurality of different components to be described below. Referring also to FIG. 3(a), a carrier generator 134 produces the triangle waveform 67 at the carrier rate frequency and a command generator 135 produces the command waveform 68.

A voltage comparator 143 receives both the triangle and command waveforms 67, 68, compares them over a full cycle period T to determine $t_a$ where $t_a$ is the next intersection of the waveforms 67, 68 and $t_b$ where $t_b$ is the following intersection of the waveforms 67, 68, wherein the following intersection is the intersection after the next intersection.

The intersecting times $t_a$ and $t_b$ are provided to a compensator module 155 as switching signals 152. The compensator module 155 also receives a delay period signal 169 from the delay module. The compensator module 155 subtracts the delay period signal 169 from both $t_a$ and $t_b$ and produces first and second expedite signals 167, 168 wherein the first expedite signal 167 corresponds to the next intersection $t_a$ and the second expedite signal 168 corresponds to the following intersection $t_b$.

Referring to FIGS. 2, 3(b), 3(c) and 9, by comparing the carrier and command waveforms 67, 68, the voltage comparator 143 also produces a state signal 162 indicating the states of the upper and lower signals 72, 74. Between the times when the command waveform 68 intersects the carrier waveform 67 while the carrier waveform has a positive slope and prior to the next intersection between the two waveforms 67, 68, the state signal 162 indicates that the current upper signal 72 is ON. Between the times when the command waveform 68 intersects the carrier waveform 67 while the carrier waveform has a negative slope and the next intersection between the two waveforms 67, 68, the state signal 162 indicates that the current upper signal 72 is OFF.

In addition to receiving the state signal 162 an alter module 139 receives a phase signal 164. The phase signal 164 indicates the phase of the terminal current through terminal 31 (see FIG. 1) and can be determined in many different ways known in the art.

The alter module 139 considers the present state of the upper signal and the phase of the terminal current and produces an alter signal 166 indicating how the switching signal 152 should be altered. If the phase signal 164 is positive and the state signal 162 indicates that the present upper signal is OFF the alter signal 166 indicates that the next switching signal $t_a$ should be expedited by the delay period γ. If the phase signal 164 is negative and the state signal 162 indicates that the present upper signal is OFF, the alter signal 166 indicates that the following switching signal $t_b$ should be expedited by the delay period γ. When any other set of conditions exists, the alter signal 166 indicates that the switching signal 152 should not be altered.

A pulse generator 179 receives the alter signal 166, the first and second expedite signals 167 and 1.68, and the switching signal 152. If the alter signal 166 indicates that the next switching signal $t_a$ should be expedited, the pulse generator produces a switch pulse by passing the first expedite signal 167. If the alter signal 166 indicates that the following switching signal should be expedited, the pulse generator 179 produces a switch pulse 180 by passing the second expedite signal 168. If the alter signal indicates that the switch pulse 152 should not be altered, the pulse generator 179 produces a switch pulse 180 by passing the switch signal 152.

The switching pulse 180 is received by an upper and lower signal generator 182 which produces upper signals 184 to control switch 12 and lower signals 186 to control switch 13. Referring also to FIG. 1, the upper and lower signals 184, 186 are provided to the delay module 11 and delay periods γ are added to the turn-on times of switches 12 & 13 as described above.

Each time the state signal 162 changes, the alter module 139 produces a new alter signal 166 directing the pulse generator 179 to produce another switching pulse 180.

SYMMETRICAL PULSE METHOD

In the symmetrical pulse method, rather than altering the turn-on and turn-off times by γ, the turn-on and turn-off times are shifted by $$\frac{\gamma}{2}.$$

Referring to FIGS. 2, 7(a), 7(b) and 7(h), ideal upper and lower signals 122, 123 and an ideal terminal voltage sequence 125 can be observed. Assuming the terminal current 69 is positive, referring to FIGS. 7(c) and 7(d), half of the delay period $$\frac{\gamma}{2}$$

is subtracted from the turn-on time $t_{u1}$ of the upper signal 122 and turn-off time $t_{o2}$ of the lower signal 123, and half the delay period $$\frac{\gamma}{2}$$

is added to the turn-off time $t_{o1}$ of the upper signal 122 and to the turn-on time of $t_{u2}$ of the lower signal 123 producing altered upper and lower signals 126, 127 having altered turn-on $t_{u1'}$, $t_{u2'}$ and turn-off $t_{o1'}$, $t_{o2'}$ times respectively. A delay period γ is added to the turn-on time $t_{u1'}$ and $t_{u2'}$ each altered signal 126, 127 producing delayed upper and lower signals 129, 130 (see FIGS. 7(e) and 7(f)) wherein the delayed upper signal has a delayed turn-on time $t_{u1''}$ that occurs later than the turn-on time $t_{u1}$ of the ideal Upper signal 122 (see FIG. 7(a)). The resultant terminal voltage pulse 132 is seen in FIG. 7(g).

Figure 7A:
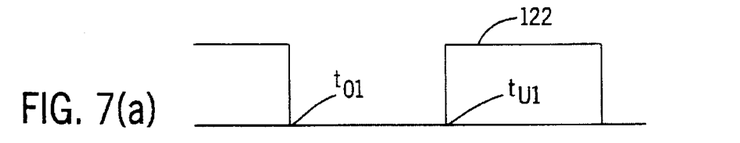
FIGS. 7(a)–7(f) are graphs illustrating PWM firing pulses and FIGS. 7(g) and 7(h) are graphs illustrating high frequency pulses.
Figure 7B:
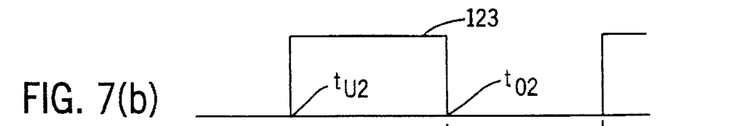
Figures 7C, 7D, 7E, 7F:
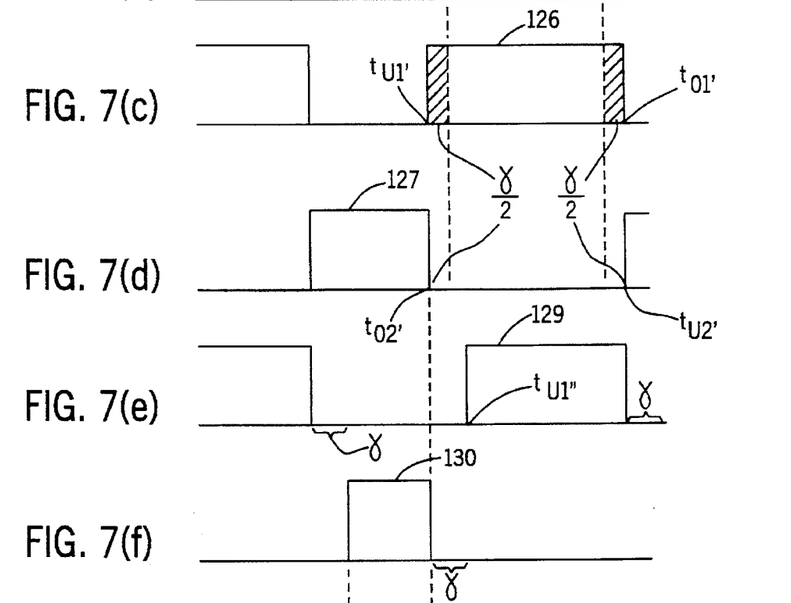
Figure 7G:
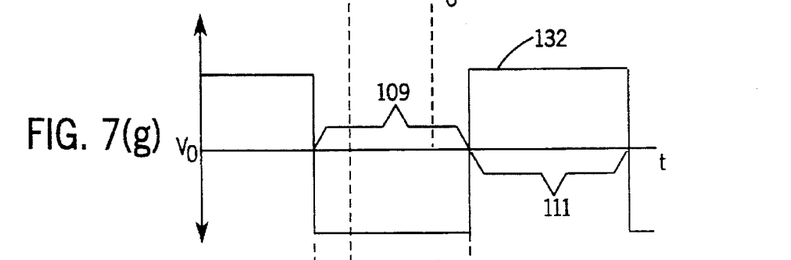
Figure 7H:
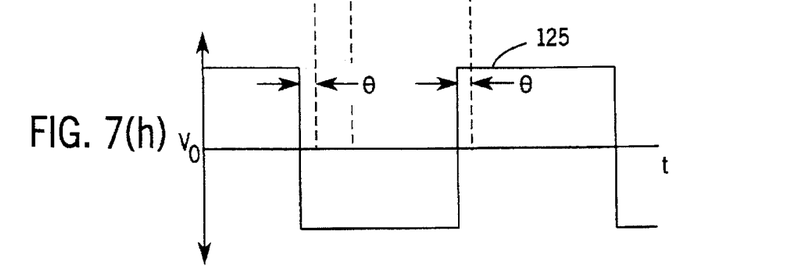

Referring to FIGS. 7(g) and 7(h), comparing the resultant voltage pulse sequence 132 to the ideal voltage pulse sequence 125, the resultant pulse sequence 132 and the ideal pulse sequence 125 are identical except for a phase shift θ equal to $$\frac{\gamma}{2}.$$

Thus, referring again to FIG. 2, when the symmetrical method is used, the low frequency alternating voltage 62 will be ideal during the positive phase, except for a $$\frac{\gamma}{2}$$

phase shift.

Figures 8A, 8B:
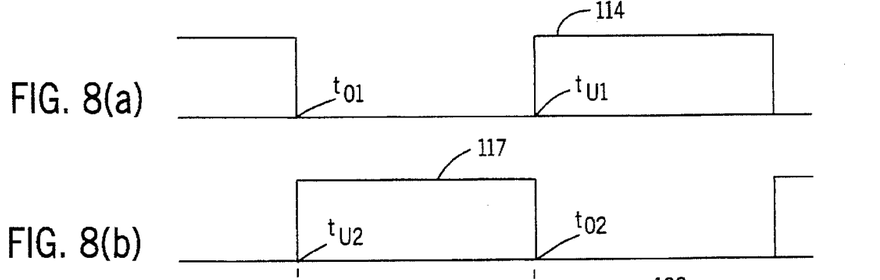
FIGS. 8(a)–8(f) are graphs illustrating PWM firing pulses and FIGS. 8(g) and 8(h) are graphs illustrating high frequency pulses.

During the negative phase of the low frequency alternating voltage, the symmetrical method also requires altered turn-on and turn-off times. Referring to FIGS. 8(a), 8(b) and 8(h), ideal upper and lower signals 114, 117 and an ideal high frequency voltage pulse sequence 118 can be observed.

Figures 8C, 8D:
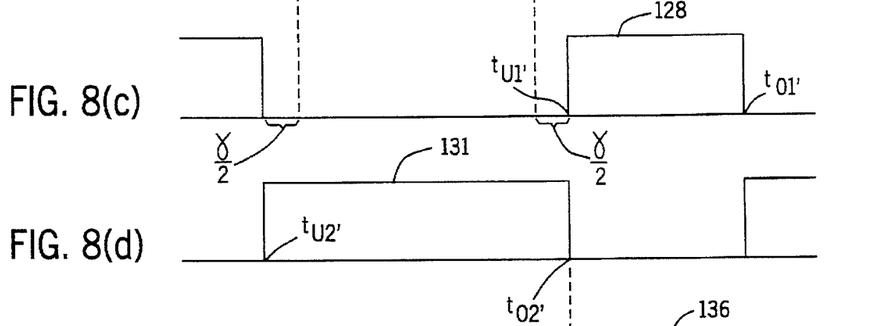
Figures 8E, 8F:
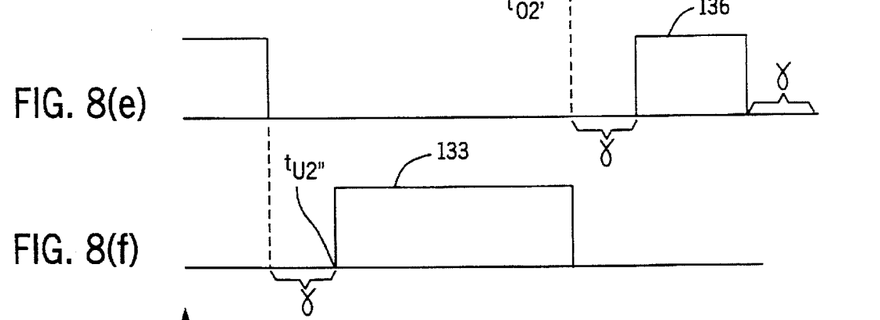
Figures 8G, 8H:
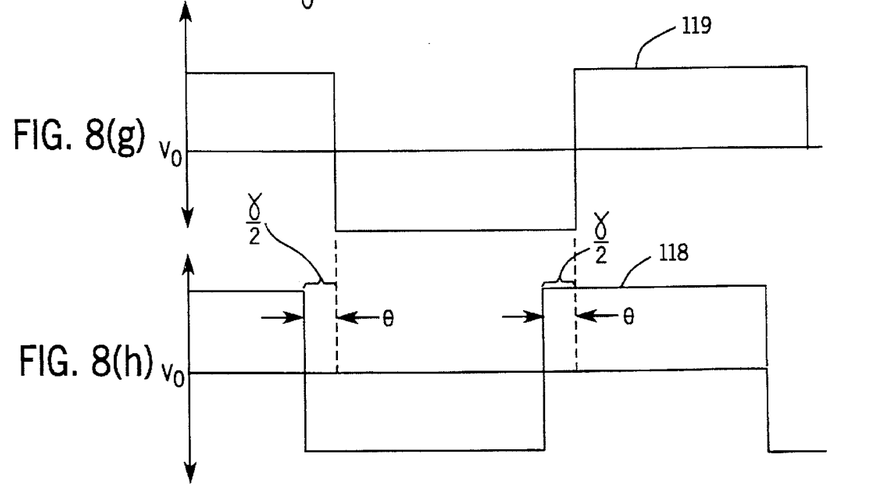

Assuming the terminal current is negative, referring to FIGS. 8(c) and 8(d), half of the delay period $$\frac{\gamma}{2}$$

is subtracted from the turn-on time $t_{u2}$ of the lower signal 117 and turn-off time $t_{o1}$ of the upper signal 114, and half the delay period $$\frac{\gamma}{2}$$

is added to the turn-off time $t_{o2}$ of the lower signal 117 and to the turn-on time of $t_{u1}$ of the upper signal 114 producing altered upper and lower signals 128, 131 having altered turn-on $t_{u1'}$, $t_{u2'}$ and turn-off $t_{o1'}$, $t_{o2'}$ times respectively. A delay period γ is added to the turn-on time $t_{u1'}$, $t_{u2'}$ of each altered signal 128, 131 producing delayed upper and lower signals 136, 133 (see FIGS. 8(e) and 8(f)) wherein the delayed lower signal has a delayed turn-on time $t_{u2''}$. The resultant terminal voltage pulse sequence 119 is seen in FIG. 8(g).

Referring to FIGS. 8(g) and 8(h), comparing the resultant terminal voltage pulse sequence 119 to the ideal high frequency voltage pulse sequence 118, the resultant pulse sequence 119 and the ideal sequence 118 are identical except for a phase shift θ equal to $$\frac{\gamma}{2}.$$

Thus, referring again to FIG. 2, when the symmetrical pulse method is used, the low frequency alternating voltage 62 will be ideal during the negative phase, except for a $$\frac{\gamma}{2}$$

phase shift.

Figure 10:
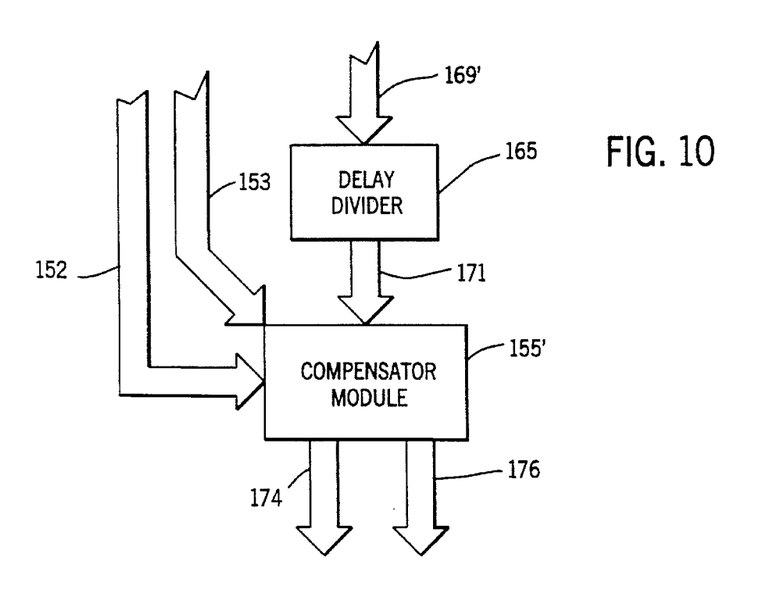
FIG. 10 is a block diagram of a preferred portion of the signal generator shown in FIG. 9 having a delay divider.

Referring now to FIG. 10, the apparatus used with the symmetrical pulse method employs a signal generator that is nearly identical to the signal generator for the unsymmetrical method described in reference to FIG. 9.

To avoid repetitive disclosure, only the parts of the symmetrical pulse apparatus that are unique to the symmetrical pulse method will be described here. Referring to FIG. 10, the symmetrical pulse apparatus employs a signal generator having a delay divider 165 that receives the delay period signal 169', divides the delay period signal 169' by two, and provides a half delay signal 171 to the compensator module 155'. In the symmetrical pulse method, instead of producing just two expedite signals 167, 168, the compensator module 155' produces two sets of expedite delay signals 174, 176.

Referring also to FIGS. 7(c) and 7(d), to produce the first set of expedite and delay signals 174 the compensator module 155 expedites the first switching signal $t_a$ by the half delay signal 171 and delays the second switching signal $t_b$ by the half delay signal 171.

To produce the second set of expedite and delay signals 176, the compensator module 155 delays the first switching signal $t_a$ by the half delay signal 171 and expedites the second switching signal $t_b$ by the half delay signal 171. Thus, in the symmetrical pulse apparatus, the first set of expedite and delay signals 174 consists of two altered switching signals and the second set of signals 176 also consists of two altered switching signals. The two sets of signals 174, 176 are provided to the pulse generator 179 (see FIG. 9) which operates substantially as described above.

Referring again to FIG. 9, in the symmetrical pulse apparatus, the alter module 139 again receives phase and state signals 164, 162 and produces an alter signal 166 selecting either the expedite or delay signals 167, 168. If the phase signal 164 indicates that the terminal current is positive and the state signal 162 indicates that the present upper signal is OFF, the alter signal 166 indicates that the first set of expedite and delay signals 174 should be passed. If the phase signal 164 indicates that the terminal current is negative and the state signal 162 indicates that the present upper signal is OFF, the alter signal 166 indicates that the second set of expedite delay signals 176 should be passed. If any other condition exists, the alter module 139 indicates that signal 152 should be passed.

Importantly, because many processors can only alter PWM voltage pulses symmetrically (i.e. both the turn-on and turn-off times of a pulse), the symmetrical pulse method is extremely important. For example, when the model 80C 196 microelectronic processor as supplied by Intel Corporation of Santa Clara, Calif., is operating in mode 0, it can only alter pluses once during a carrier signal period and cannot interrupt the pulse during each carrier half cycle. Thus, these types of processors must take advantage of the symmetrical pulse method in order to meet the objectives of the present invention.

It should be understood that the methods and apparatuses described above are only exemplary and do not limit the scope of the invention, and that various modifications could be made by those skilled in the art that would fall under the scope of the invention. For example, a timing module could be added to the signal generator to control the firing pulses and switching pulses in a real time manner. In addition, the upper and lower signals could be altered after the upper and lower signals are generated and before the delay periods are added. The alterations could also be implemented after the delay periods are added. Furthermore, either of the methods described above could be implemented in software or some other hardware configuration. To apprise the public of the scope of this invention, we make the following claims:

We claim:

1. A method for providing an alternating current at a power lead for driving an AC induction motor, the method comprising the steps of:

a) switching the power lead at periodic switching times among a positive DC voltage and a negative DC voltage to produce the alternating current wherein the power lead is in a transition state just prior to each switching time;

b) controlling the switching times so that:

(i) if the alternating current is positive and the power lead is connected to the negative DC voltage, altering subsequent switching times including the next two switching times so that the power lead is connected to the positive DC voltage at an earlier point in time and the power lead is disconnected from the negative DC voltage at an earlier point in time; and (ii) if the alternating current is negative and the power lead is connected to the negative DC voltage, changing subsequent switching times including the following two switching times so that the power lead is connected to the negative DC voltage at an earlier point in time and the power lead is disconnected from the positive DC voltage at an earlier point in time, wherein the following two switching times are the two switching times after the next two switching times.

2. The method as recited in claim 1 wherein the power lead remains in the transition state for a delay period and the step of altering subsequent switching times includes the step of subtracting the delay period from each of the next two switching times and the step of changing subsequent switching times includes the step of subtracting the delay period from each of the following two switching times.

3. The method as recited in claim 1 wherein the step of altering subsequent switching times includes the step of delaying the two following switching times so that the following switching times occur at a later point in time and wherein the step of changing the subsequent switching times includes the step of delaying the next two switching times so that the next two switching times occur at a later point in time.

4. The method as recited in claim 3 wherein the power lead remains in the transition state for a delay period and the step of altering subsequent switching times includes the steps of subtracting the delay period from the next two switching times and adding the delay period to the following two switching times and the step of changing subsequent switching times includes the steps of adding the delay period to the next two switching times and subtracting the delay period from the following two switching times.

5. The method as recited in claim 4 further including the step of dividing the delay period by two to produce a new delay period and replacing the delay period with the new delay period prior to altering and changing the next and following switching times.

6. A method to be used with a variable frequency motor controller, the controller including an inverter, a delay module, and a signal generator, the inverter receiving DC voltage from a DC voltage supply and producing an alternating voltage and a related alternating current, the signal generator providing related upper and lower signals for controlling the inverter, each of the upper and lower signals being either in an ON state or a OFF state, the signal states being altered in a repetitive sequence such that when one signal is ON, the other is OFF, a turn-on time for each signal is defined each time said signal goes from the OFF to the ON state and a switching instance is defined each time the state of the upper signal changes, the signal generator providing the upper and lower signals to the delay module that delays the turn-on time of each signal by a delay period, the method compensating for deviations in the alternating voltage due to the switching sequence, the method comprising the steps of:

receiving the upper signal;

determining the state of the upper signal;

determining a next switching instance and a following switching instance, wherein the following switching instance is the switching instance after the next switching instance;

determining the phase of the alternating current;

if the phase of the alternating current is positive and the upper signal is OFF, altering subsequent switching instances including the next switching instance so that the next switching instance occurs earlier in time, thus producing a new switching instance;

if the phase of the alternating current is negative and the upper signal is OFF, changing subsequent switching instances including the following switching instance so that the following switching instance occurs at an earlier point in time, thus producing a new switching instance; and providing the new switching instance to the delay module.

7. The method as recited in claim 6 further including the step of receiving the delay period, and wherein the step of altering the next switching instance includes the step of subtracting the delay period from the next switching instance and the step of changing the following switching instance includes the step of subtracting the delay period from the following switching instance to produce new switching instances.

8. The method as recited in claim 6 further including the steps of receiving the delay period and dividing the delay period by 2 to produce a modified period, and wherein the step of altering subsequent switching instances includes the steps of subtracting the modified period from the next switching instance and adding the modified period to the following switching instance, and the step of changing subsequent switching instances includes the steps of adding the modified period to the next switching instance and subtracting the modified period from the following switching instance to produce new switching instances.

9. An apparatus providing an alternating current at a power lead for driving an AC induction motor, the apparatus comprising:

a) a switch to alternately connect the power lead at periodic switching times among a positive DC voltage and a negative DC voltage to produce the alternating current;

b) a controller that controls the switching times so that:

(i) if the alternating current is positive and the power lead is connected to the negative DC voltage, subsequent switching times are altered, including the next two switching times, so that the power lead is connected to the positive DC voltage at an earlier point in time and the power lead is disconnected from the negative DC voltage at an earlier point in time; and (ii) if the alternating current is negative and the power lead is connected to the negative DC voltage, subsequent switching times are changed, including the following two switching times, so that the power lead is connected to the negative DC voltage at an earlier point in time and the power lead is disconnected from the positive DC voltage at an earlier point in time, wherein the following two switching times are the two switching times after the next two switching times.

10. The apparatus as recited in claim 9 wherein the controller controls the switching times so that the power lead remains in the neutral state for a delay period and the controller includes a subtractor that alters the subsequent switching times by subtracting the delay period from each of the next two switching times and that changes the subsequent switching times by subtracting the delay period from each of the following two switching times.

11. The apparatus as recited in claim 9 wherein the controller includes a compensator module that:

a) if the alternating current is positive and the power lead is connected to the negative DC voltage, alters subsequent switching times by delaying the two following switching times so that the following switching times occur at a later point in time; and b) if the alternating current is negative and the power lead is connected to the negative DC voltage, changes subsequent switching times by delaying the next two switching times so that the next two switching times occur at a later point in time.

12. The apparatus as recited in claim 11 wherein the controller controls the switching times so that the power lead remains in the transition state for a delay period and the controller includes a subtractor that alters the subsequent switching times by subtracting the delay period from the next two switching times and that changes the following two switching times by subtracting the delay period from the following two switching times, and wherein the compensator module includes an adder that alters the two following switching times by adding the delay period to the two following switching times and changes the next two switching times by adding the delay period to the next two switching times.

13. The apparatus as recited in claim 12 further including a delay divider that receives the delay period and divides the delay period by two to produce a new delay period to replace the delay period prior to altering and changing the next and following switching times.

14. An apparatus to be used with a variable frequency motor controller, the controller including an inverter, a delay module, and a signal generator, the inverter receiving DC voltage from a DC voltage supply and producing an alternating voltage and a related alternating current, the signal generator providing related upper and lower signals for controlling the inverter, each of the upper and lower signals being either in an ON state or an OFF state, the signal states being altered in a repetitive sequence such that when one signal is ON, the other is OFF, a turn-on time for each signal is defined each time said signal goes from the OFF to the ON state and a switching instance is defined each time the state of the upper signal changes, the signal generator providing the upper and lower signals to the delay module that delays the turn-on time of each signal by a delay period, the apparatus compensating for deviations in the alternating voltage due to the switching sequence, the apparatus comprising:

a state sensor for determining the state of the upper signal;

a switching sensor that determines the next switching instance and the following switching instance, wherein the following switching instance is the switching instance after the next switching instance;

a phase sensor that determines the phase of the alternating current;

a regulator module that receives state, switching, and phase information and alters subsequent switching instances including the next switching instance so that the next switching instance occurs earlier in time when the phase of the alternating current is positive and the upper signal is OFF, thus producing a new switching instance, the regulator module also changes subsequent switching instances including the following switching instance so that the following switching instance occurs at an earlier point in time when the phase of the alternating current is negative and the upper signal is OFF, thus producing a new switching instance.

15. The apparatus as recited in claim 14 wherein the regulator module includes:

a processor that receives the delay period; and a subtractor that alters the next switching instance by subtracting the delay period from the next switching instance and changes the following switching instance by subtracting the delay period from the following switching instance thus producing a new switching instance.

16. The apparatus as recited in claim 14 wherein the timing regulator includes:

a processor that receives the delay period and divides the delay period by 2 to produce a modified period; and a subtractor that alters the next switching instance by subtracting the modified period from the next switching instance and changes the following switching instance by subtracting the modified period from the following switching instance, and an adder that alters the following the switching instance by adding the modified period to the following switching instance and changes the next switching instance by adding the modified period to the next switching instance.

17. An apparatus to be used with a variable frequency motor controller, the controller including an invertor, a delay module, and a signal generator, the invertor receiving DC voltage from a DC voltage supply and producing an alternating voltage and a related alternating current, the signal generator providing related upper and lower signals for controlling the invertor, each of the upper and lower signals being either in an ON state or an OFF state, the signal states being altered in a repetitive sequence such that when one signal is ON, the other is OFF, a turn-on switching instance is defined each time the upper signal goes from the OFF state to the ON state and a turn-off switching instance is defined each time the upper signal goes from the ON state to the OFF state, a turn-on time is defined each time either the upper or lower signal goes from the OFF state to the ON state, the signal generator providing the upper and lower signals to the delay module, the delay module delaying each turn-on time by a delay period to produce delayed upper and lower signals, the apparatus compensating for deviations in the alternating voltage due to the switching sequence, the apparatus comprising:

a state sensor for determining the state of the upper signal;

a switching sensor that determines the next turn-on switching instance and the next turn-off switching instance;

a phase sensor that determines the phase of the alternating current; and a regulator module that receives state, switching, and phase information and alters the next turn-on switching instance and next turn-off switching instance so that:
  (a) if the phase of the alternating current is negative the next turn-off switching instance occurs at an earlier point in time; and
  (b) if the phase of the alternating current is positive the next turn-on switching instance occurs at an earlier point in time.

18. The apparatus as recited in claim 17 wherein the regulator alters the next turn-on and turn-off times by changing their times of occurrence by the delay period.

19. An apparatus to be used with a variable frequency motor controller, the controller including an invertor, a delay module, and a signal generator, the invertor receiving DC voltage from a DC voltage supply and producing an alternating voltage and a related alternating current, the signal generator providing related upper and lower signals for controlling the invertor, each of the upper and lower signals being either in an ON state or an OFF state, the signal states being altered in a repetitive sequence such that when one signal is ON, the other is OFF, a turn-on switching instance is defined each time the upper signal goes from the OFF state to the ON state and a turn-off switching instance is defined each time the upper signal goes from the ON state to the OFF state, a turn-on time is defined each time either the upper or lower signal goes from the OFF state to the ON state, the signal generator providing the upper and lower signals to the delay module, the delay module delaying each turn-on time by a delay period to produce delayed upper and lower signals, the apparatus compensating for deviations in the alternating voltage due to the switching sequence, the apparatus comprising:

a state sensor for determining the state of the upper signal;

a switching sensor that determines the next turn-on switching instance and the next turn-off switching instance;

a phase sensor that determines the phase of the alternating current; and a regulator module that receives state, switching, and phase information and alters the next turn-on switching instance and next turn-off switching instance so that:
  (a) if the phase of the alternating current is negative and the upper signal is OFF, the next turn-on switching instance occurs at a later point in time and the next turn-off switching instance occurs at an earlier point in time; and
  (b) if the phase of the alternating current is positive and the upper signal is OFF, the next turn-on switching instance occurs at an earlier point in time and the next turn-off switching instance occurs at a later point in time.

20. The apparatus as recited in claim 19 further including a processor that receives the delay period and divides the delay period by 2 to produce a modified period, and wherein the regulator module alters the turn-on and turn-off switching instances by changing their times of occurrence by the modified period.

21. A method to be used with a variable frequency motor controller for compensating for deviations in an alternating voltage due to a switching sequence, the controller including an invertor, a delay module, and a signal generator, the invertor receiving DC voltage from a DC voltage supply and producing the alternating voltage and a related alternating current, the signal generator providing related upper and lower signals for controlling the invertor, each of the upper and lower signals being either in an ON state or an OFF state, the signal states being altered in a repetitive sequence such that when one signal is ON, the other is OFF, a turn-on switching instance is defined each time the upper signal goes from the OFF state to the ON state and a turn-off switching instance is defined each time the upper signal goes from the ON state to the OFF state, a turn-on time is defined each time either the upper or lower signal goes from the OFF state to the ON state, the signal generator providing the upper and lower signals to the delay module, the delay module delaying each turn-on time by a delay period to produce delayed upper and lower signals, the method comprising the steps of:

determining the state of the upper signal;

determining the next turn-on switching instance and the next turn-off switching instance;

determining the phase of the alternating current; and altering the next turn-on and next turn-off switching instances so that:
  (a) if the phase of the alternating current is negative the next turn-off switching instance occurs at an earlier point in time; and
  (b) if the phase of the alternating current is positive the next turn-on switching instance occurs at an earlier point in time.

22. The method as recited in claim 21 wherein the step of altering the next turn-on and turn-off switching instances includes the step of changing the turn-on and turn-off switching instances by the delay period.

23. A method to be used with a variable frequency motor controller for compensating for deviations in an alternating voltage due to a switching sequence, the controller including an invertor, a delay module, and a signal generator, the invertor receiving DC voltage from a DC voltage supply and producing the alternating voltage and a related alternating current, the signal generator providing related upper and lower signals for controlling the invertor, each of the upper and lower signals being either in an ON state or an OFF state, the signal states being altered in a repetitive sequence such that when one signal is ON, the other is OFF, a turn-on switching instance is defined each time the upper signal goes from the OFF state to the ON state and a turn-off switching instance is defined each time the upper signal goes from the ON state to the OFF state, a turn-on time is defined each time either the upper or lower signal goes from the OFF state to the ON state, the signal generator providing the upper and lower signals to the delay module, the delay module delaying each turn-on time by a delay period to produce delayed upper and lower signals, the method comprising the steps of:

determining the state of the upper signal;

determining the next turn-on switching instance and the next turn-off switching instance;

determining the phase of the alternating current; and altering the next turn-on and next turn-off switching instances so that:

(a) if the phase of the alternating current is negative and the upper signal is OFF, changing the switching instances so that the next turn-on switching instance occurs at a later point in time and the next turn-off switching instance occurs at an earlier point in time; and     (b) if the phase of the alternating current is positive and the upper signal is OFF, changing the switching instances so that the next turn-on switching instance occurs at an earlier point in time and the next turn-off switching instance occurs at a later point in time.

24. The method as recited in claim 23 further including the steps receiving the delay period and divides the delay period by 2 to produce a modified period, and substituting the modified period for the delay period prior to altering the switching instances.

* * * * *